United States Patent [19]

Chu et al.

[11] Patent Number: 5,159,219
[45] Date of Patent: Oct. 27, 1992

[54] OPPOSED-MAGNET BEARING WITH INTERPOSED SUPERCONDUCTOR

[75] Inventors: Wei-Kan Chu; Ki-Bui Ma; Chase K. McMichael, all of Houston, Tex.

[73] Assignee: University of Houston-University Park, Houston, Tex.

[21] Appl. No.: 701,206

[22] Filed: May 16, 1991

[51] Int. Cl.$^5$ .................. H02K 7/09; H01L 39/02; F16C 39/06; H01F 7/22
[52] U.S. Cl. .................................. 310/90.5; 505/876
[58] Field of Search .................. 310/52, 90.5; 505/1, 505/876

[56] References Cited

U.S. PATENT DOCUMENTS

| | | |
|---|---|---|
| 3,005,117 | 10/1961 | Buchhold . |
| 3,026,151 | 3/1962 | Buchhold . |
| 3,261,210 | 7/1966 | Buchhold . |
| 3,378,315 | 4/1968 | Webb et al. . |
| 3,422,765 | 1/1969 | Griffin . |
| 3,572,854 | 3/1971 | Danby . |
| 3,612,630 | 10/1971 | Rosensweig . |
| 3,779,618 | 12/1973 | Soglia et al. . |
| 3,890,019 | 6/1975 | Boden et al. . |
| 4,068,746 | 11/1977 | Mole et al. . |
| 4,147,396 | 4/1979 | Lyman . |
| 4,493,275 | 1/1985 | Stone et al. . |
| 4,545,209 | 10/1985 | Young . |
| 4,563,046 | 1/1986 | Shimamoto . |
| 4,797,386 | 1/1989 | Gyorgy et al. ............ 310/90.5 |
| 4,843,504 | 6/1989 | Barnes . |
| 4,879,537 | 11/1989 | Marshall et al. ............ 310/90.5 |
| 4,886,778 | 12/1989 | Moon et al. . |
| 4,892,862 | 1/1990 | Agarwala ............ 310/90.5 |
| 4,908,347 | 3/1990 | Denk . |
| 4,926,082 | 5/1990 | Barnes . |
| 4,939,120 | 7/1990 | Moon et al. . |
| 4,987,674 | 1/1991 | Denk . |
| 5,023,497 | 6/1991 | Pereny ............ 310/90.5 |
| 5,061,679 | 10/1991 | Weeks, II ............ 310/90.5 |

FOREIGN PATENT DOCUMENTS 875-121 10/1981 U.S.S.R. .

OTHER PUBLICATIONS

Marinescu et al., *Passive Axial Stabilization of a Magnetic Radial Bearing by Superconductors,* IEEE Transactions on Magnetics, vol. 25, No. 5 at pp. 3233-3235 (Sep. 1989).

Takamori et al., *Magnetic Field Controlled Levitation and Suspension of a Magnet Above and Below Type II Superconductors,* Appl. Phys. Lett. 55(14), pp. 1454-1456 (Oct. 1989).

Primary Examiner—Steven L. Stephan
Assistant Examiner—D. L. Rebsch
Attorney, Agent, or Firm—Pravel, Gambrell, Hewitt, Kimball & Krieger

[57] ABSTRACT

A superconductor-magnet system having high thrust and stability, with a method for increasing the thrust and stability of such a system, comprises a first magnet, a second magnet and a superconductor. The magnets are in motion relative to each other and the superconductor is in motion relative to one and stationary relative to the other magnet. High thrust and stability can be achieved by increasing the magnetic field of the magnet in motion relative to the superconductor. Also disclosed are magnetic thrust and journal bearings utilizing the above system.

20 Claims, 4 Drawing Sheets

OPPOSED-MAGNET BEARING WITH INTERPOSED SUPERCONDUCTOR

The present invention was made at least in part with U.S. Government support and the U.S. Government has certain rights in the invention.

BACKGROUND OF THE INVENTION

1. Field of the Invention

The present invention relates to novel magnet-superconductor systems, and to bearings and other articles utilizing magnet-superconductor systems. In another aspect the present invention relates to magnet-superconductor systems having high thrust and high stability and to a method for increasing the thrust and stability of magnet-superconductor systems. In still another aspect the present invention relates to bearings and other articles utilizing magnet-superconductor systems having high thrust and high stability, and to methods of increasing the thrust and stability of bearings and other articles utilizing magnet-superconductor systems.

2. Description of the Prior Art

Conventional mechanical bearings used in conjunction with high rotational speed devices are subject to metal wear, noise, vibration and friction heating problems. These problems can often lead to seizure or other failure of the bearing. In addition, mechanical bearings often require lubricants which fail in severe environments such as those commonly encountered in outer space. Failure of conventional liquid lubricants in outer space is usually due to the vacuum conditions that cause the lubricants to outgas, leaving bearing surfaces dry and resulting in the ultimate failure of the bearings.

As a result of these and other shortcomings, there has been considerable emphasis on the development of alternatives to mechanical bearings. For example, work has been done to develop more efficient air bearings, as well as magnetically suspended bearings.

One problem with air bearings is that they require a completely pneumatic system, including pumps, valves, seals, and conduits, for their operation. Another shortcoming of air bearings is that they result in a continuous energy loss. For example, a high speed cryo-cooler system in outer space applications, would suffer a 10-20 watt energy loss due to bearing friction losses. Even in non-space applications, use of an air system adds significant cost, size, and weight to the bearing package and introduces various reliability problems normally associated with pneumatic system components.

Because of the fine tolerances required, which are on the order of one ten-thousandth of an inch, air bearings themselves are difficult to manufacture, and thus expensive. Furthermore, air bearings are highly vulnerable to contaminants. A particle of dust as small as four ten-thousandths of an inch can interfere with air gaps and clog pores of graphite or other diffusive coating.

As an alternative to air bearings, magnetically suspended bearings have been developed. Conventional magnetically suspended bearings ar generally unstable and require for their operability control means, such as rapidly acting feedback control systems, to compensate for displacements from the set point. Until recently, magnetic bearings have been of one of two types—either permanent magnets or electromagnets.

Because permanent magnet magnetic field strength is generally limited, the use of permanents magnets is limited to applications where very small forces are adequate. Electromagnets, which can supply considerably more magnetic force than comparable permanent magnets, are much more convenient to use and are thus preferred for use in conjunction with feedback control systems. However, because of the required feedback control systems, use of electromagnets adds considerably to the cost, size, and operational complexity of the system.

It has been appreciated for years that magnetic fields strongly interact with superconducting materials. Recent research activities have brought the discovery of "high temperature superconducting" (HTS) compounds. HTS compounds are those which superconduct at and below a critical temperature, $T_c$, which is above the boiling point temperature of nitrogen.

Since they are superconductive at temperatures greater than 77° K., the new CuO high temperature superconductors may be cooled with liquid nitrogen, which is a far less costly refrigerant than helium. As a result, the rather complex thermal insulation and helium-recycling systems, necessary to avoid wasting the expensive helium coolant required for the low temperature superconducting material previously known, are no longer necessary. The HTS compounds simplify and enhance the reliability of commercial applications of superconductors. Liquid nitrogen is about 2000 times more efficient to use in terms of cost, when both the refrigerant itself and the associated refrigerant unit design are considered.

Magnetic fields are disclosed for use as bearings in U.S. Pat. No. 3,810,683. Use of superconductors for support bearings are taught in U.S. Pat. No. 3,378,315, wherein superconducting material is used for a spindle bearing with either permanent magnets or electromagnets providing the supporting magnetic field. U. S. Pat. No. 3,026,151 shows superconductor bearings with the actuator coils likewise formed of superconducting materials.

The recent advances in superconducting materials and the parallel advancements in the field of permanent magnets have made it possible to economically and efficiently couple a superconducting member with a magnetic member to produce highly efficient and relatively inexpensive bearings.

Superconductive materials are of two basic types, designated as Type I and Type II. Efforts have been made in the past to improve magnetic bearing technology by maintaining either the bearing member or the rotating member, or both, in a Type I superconducting state to achieve sufficient magnetic pressure to provide the desired degree of levitation. Unlike Type II superconductors, Type I superconductors are incapable of effecting suspension.

Type I superconductors feature perfect diamagnetism up to a critical applied field, at which point superconductivity is lost and the magnetization of the sample rises abruptly. Examples of superconducting bearings of Type I materials can be found in U.S. Pat. Nos. 3,493,274 and 3,026,151. In order to achieve stability in these systems, the bearing structures must rely on either a mechanical rotary support: or must employ superconductors shaped to provide a laterally stable configuration.

The recent discoveries of high temperature superconductors involve Type II materials. Whereas a Type I superconductor completely blocks out magnetic flux from its interior, a phenomenon known as diamagnetism, Type II superconductors allow a certain amount of magnetic flux to penetrate into the interior of the material, producing a suspension effect in addition to a levitation effect. Under such conditions, circulating superconducting currents are established within the superconductor.

A typical example of a system featuring a combination of Type II superconductors and permanent magnets is disclosed in U.S. Pat. No. 4,886,778, which discloses a rotating shaft having two ends, each of which contains a permanent magnet and rotates in a socket clad with superconducting material. The shaft is made to levitate above the sockets by the repulsive forces which exist between the magnets and the superconductors. The incorporation of superconductors into the bearing design offers the possibility of rendering the bearings entirely passive. The design disclosed in U.S. Pat. No. 4,886,778 has the potential for achieving very high rotational speeds, in excess of ten thousand rpm. The interaction between the rotating magnetic axial element and its stationary superconducting support takes place across a gap permeated by a strong magnetic field emanating from permanent magnets embedded in the rotating element.

However, it is desirable to increase the amount of thrust between the superconductor and the magnets with a corresponding increase in the stability. An increased amount of thrust could easily be obtained by utilizing repulsing pairs of magnets in addition. Increased thrust is obtained by increasing the magnetic field on one or both of the magnets, either by utilizing stronger permanent magnets, or increasing the current to an electromagnet. However, as the thrust is increased between repulsing pairs of magnets, the instability of those magnets in the plane normal to the magnet-magnet repulsion axis increases.

U.S. Pat. No. 4,879,537 discloses the use of a superconductor located in the magnet-magnet attraction axis between two attracting magnets. For attracting magnets the instability is along the magnet-magnet attraction axis. However, this system suffers because it is not always desirable to stabilize two attracting magnets by placing a superconductor in the magnet-magnet attraction axis between magnets.

The prior art bearing systems utilizing superconductor magnet bearings focus attention on making use of the repulsion between the superconductor and the magnet. The thrust pressure that can be supported with this repulsion is limited.

It is well known that, with a magnet levitated on a superconductor only, the lateral stability is directly proportional to the levitation force.

With an additional magnet the increase in the levitation force would not automatically be matched by a proportionate increase in the lateral stability. This is evident, since the system would most certainly be rendered unstable in the limit of a very small superconductor, and a very strong additional magnet. This suggests that an increase in the levitation force using an additional magnet may be at the expense of a decrease in the stability of the system.

There exists a need in the art for both a repulsive magnet-magnet system having high stability and being able to generate high thrust, and an attractive magnet-magnet system having high stability and being able to generate high thrust.

It is desirable to provide a magnetic bearing which would use the magnetic forces generated with such systems to enable a rotating member to reach and sustain ultra-high rotational speeds with low energy dissipation. Specifically, there is a clear need for magnetic bearing systems having minimal rotational friction and energy dissipation.

It would also be desirable to have a bearing system which would be automatically stable for long periods of time and in all possible directions and which will not require external feedback or other control means to maintain stability.

In addition it is also desirable to provide an apparatus for magnetically suspending and centering a body which rotates about a axis.

It would be desirable to be able to generate higher forces and enhanced stability with low energy losses, than would ordinarily be possible with the prior art magnet-magnet or superconductor-magnets systems.

It would be desirable to have a combined bearing system which would include both a gas bearing or an electromagnetic system for purposes of control and also a superconductor/magnet bearing.

It would be desirable to have an auxiliary control system activated by signals from sensors, such as proximity probes, which are used detect the position of the shaft. The control system would be based on conventional feedback systems such as a gas, foil, tilt pad, or electromagnetic systems and would be activated whenever higher forces are required than those which the magnet is able to produce. The auxiliary system would remain activated until such required forces are again within the operating range of the superconductor and magnet bearing system.

SUMMARY OF THE INVENTION

According to the present invention there are provided magnet-superconductor systems having high stability and generating or supporting high thrust which successfully address the shortcomings of the prior art configurations. Such systems comprise a first magnet, a second magnet, and a superconductor. The magnets are in relative motion to each other, may be permanent, electromagnets, superconducting electromagnets or superconducting replicas and they may be oriented to attract or repulse each other. The superconductor comprises type II superconductor material and is affixed such that it is in relative motion with respect to one of the magnets, but stationary with respect to the other magnet. In repulsive systems, the superconductor is placed between the magnets, and in attractive systems, the superconductor is placed alongside one of the magnets outside of the attraction axis. High thrust and stability is achieved by increasing the magnetic field of the magnet moving relative to the superconductor. These type of magnet-superconductor systems can be utilized in bearings and other devices.

The bearing assemblies of the present invention comprise a rotating member and at least one stationary member. Mounted on the rotating member is a first magnet, with a second magnet mounted on the stationary member. The superconductor is located such that the superconductor is stationary with respect to one magnet, but in motion relative to the other magnet. This is easily accomplished by mounting the superconductor and the first magnet, on the rotating member so that they are stationary with respect to each other, and mounting the second magnet alongside the rotating shaft s that the second magnet and the superconductor are in relative motion. The thrust and stability of the bearing system is increased by increasing the magnetic field of the second magnet, either by replacing it with a stronger magnet or by applying more current to the second magnet if it is an electromagnet.

The present invention also discloses a multi-staged magnetic bearing which combines stages of magnets to allow higher axial forces to be carried by the bearing shaft. Each stage comprises a stabilizing material located on the bearing shaft, and magnets placed annularly around, and axially on either side of the stabilizing material. Multi-staging is crucial in designs required to handle high thrust with stability when the requirement exceeds that which can be provided in a single-stage design by the strongest magnets limited either by technical feasibility or other limitations.

BRIEF DESCRIPTION OF THE DRAWINGS

The above and other embodiments of the present invention may be more fully understood from the following detailed description when taken together with the accompanying figures wherein similar reference characters refer to similar elements throughout and in which.

DETAILED DESCRIPTION OF THE INVENTION

The present invention is of a novel magnet-superconductor system. Specifically, this invention takes advantage of the interaction between a type II high temperature superconductor that moves relative to the magnetic field of one magnet and is stationary with respect to another magnet.

The magnet-superconductor systems of the present invention comprise a first magnet having a magnetic field $B_1$ and a second magnet moving relative to the first having a magnetic field $B_2$, and a type II superconductor moving relative the first magnet but not with respect to the second magnet. When repulsing magnets are utilized, the superconductor is interposed between the repulsing magnets. When attracting magnets are utilized in the present invention, the superconductor is placed alongside one of the magnets.

The recent discovery of the CuO class of high temperature superconducting ("HTS") materials has made it economical to take advantage of the repulsive forces between magnetic fields and superconducting materials.

Superconducting materials suitable for use in the present invention are the high temperature superconductors, of Type II. Currently known high temperature superconductors are generally perovskite materials, for example of the barium-yttrium copper oxide class. A preferred material is $YBa_2Cu_3O_x$. Thallium, bismuth or other ceramic-based compounds which exhibit Type II superconducting properties are also acceptable. Type II superconductors are characterized by first and second values of critical field, $H_{c,1}$ and $H_{c,2}$, where field penetration first occurs above $H_{c,1}$.

As explained above, the addition of an additional magnet to a magnet-superconductor system causing an increase in the levitation force would not automatically be matched by a proportionate increase in the lateral stability. This is evident, since the system would most certainly be rendered unstable in the limit of a very small superconductor, and a very strong additional magnet. This suggests that an increase in the levitation force using an additional magnet may be at the expense of a decrease in the stability of the system.

However, according to the present invention, when a second magnet is brought into action on a magnet levitated on a superconductor, the stability and the thrust pressure are no longer directly related to each other, but can be independently varied.

Figure 1:
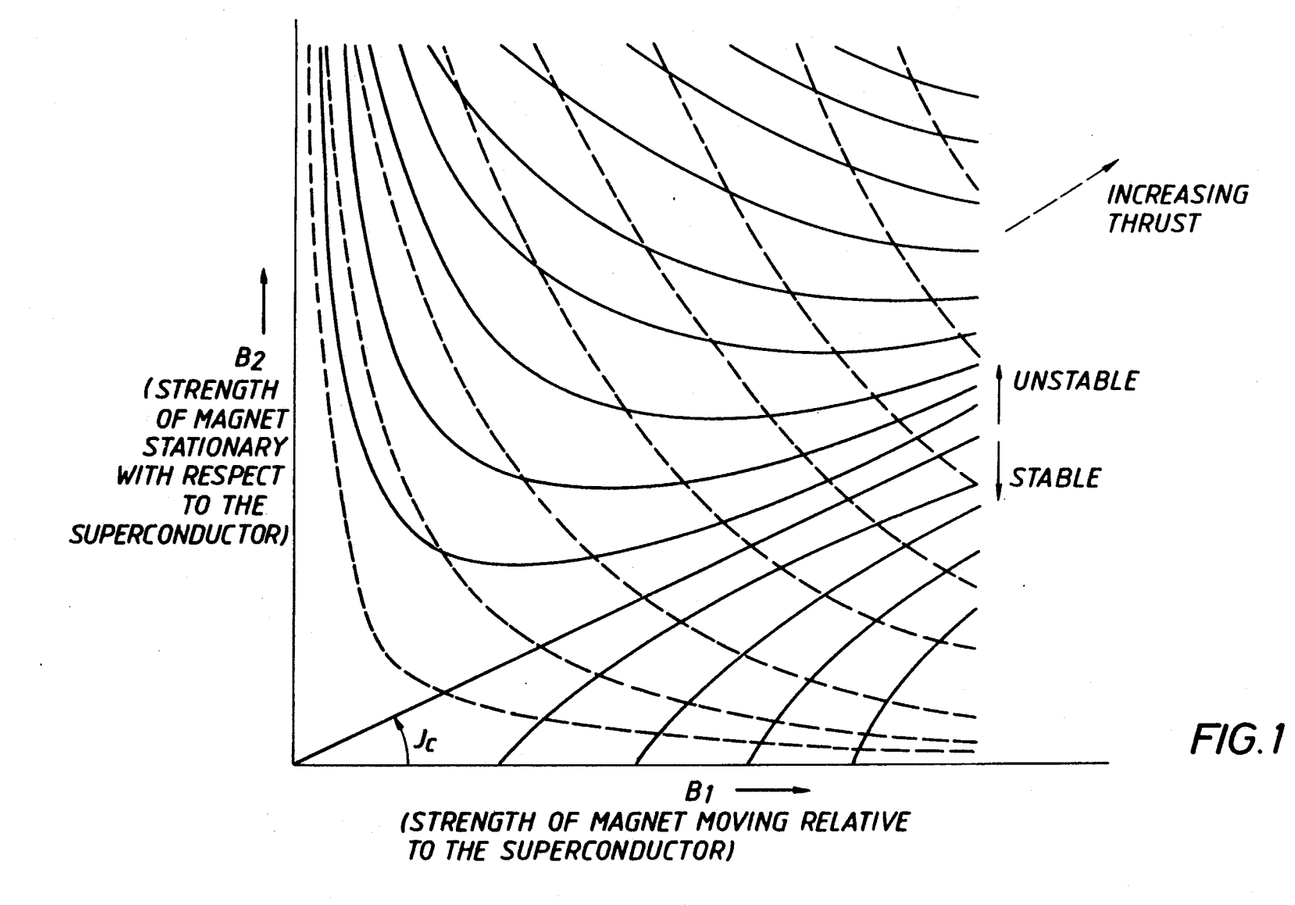
FIG. 1 is a graph showing contours of equal thrust and equal stability in the $B_1$-$B_2$ plane, for a system comprising a first magnet, a second magnet, and a superconductor, in which the first magnet has a magnetic field $B_1$ and the second magnet has a magnetic field $B_2$, the superconductor is a type II superconductor is in motion relative to magnet 1 but stationary with respect to magnet 2. The solid contours represent constant stability (or instability) lines, and the dotted contours represent constant thrust lines.

FIG. 1 is a graph showing contours of equal thrust and equal stability in the $B_1$-$B_2$ plane, for a system which comprises a first magnet $M_1$ having a magnetic field $B_1$ and a second magnet $M_2$ moving relative to the first having a magnetic field $B_2$, and a type II superconductor moving relative to magnet 1 but stationary with respect to magnet 2.

FIG. 1 shows that increasing the magnetic field strength of the magnet stationary with respect to the superconductor will increase the thrust but will decrease the stability. On the other hand, increasing the magnetic field strength of the magnet moving relative to the superconductor will increase both the thrust and the stability.

In the system of FIG. 1 the magnetic field existing in the superconductor before it is cooled to below the superconducting transition temperature remains generally the same after the superconductor is cooled sufficiently to turn superconducting. This basically approximates the lower critical magnetic field to about zero, so that there is generally about zero repulsion of a pre-existing magnetic field characteristic of the Meissner effect. Consequently, there are generally no induced currents or magnetization associated with the superconductor immediately after it is field cooled. Hence, for an initial small change in an external magnetic field, the induced currents would change from being non-existent to a small value. Under such conditions, the superconductor cannot support any voltage, and hence the magnetic flux threading through its interior must stay constant.

Also, the response of the field cooled (the magnets and the superconductors are assembled into the bearing first, and then cooled to below the superconducting transition temperature) superconductor to an initial small disturbance in an external magnetic field is to completely shield its interior from any changes of the existing magnetic field. This response is generally reversible and not dissipative.

In the above described system, there is generally no force between the superconductor and any of the magnets. Thus, in the case of two permanent uniformly magnetized magnets M1 and M2, with magnetizations $M_1$ and $M_2$ respectively, the following equation can be written $$P = \alpha M_1 M_2 \qquad (1)$$

wherein P is the force exerted on magnet M1, $\alpha$ is a vector that depends only on the geometry of the two magnets.

Because the response of a field cooled superconductor to an initial small disturbance in an external magnetic field is to completely shield its interior from any changes of the existing magnetic field, this response is generally reversible and not dissipative, the following equation for the stability of the system can be written as $$S = -\beta M_1 M_2 + \gamma M_1^2 \qquad (2)$$

wherein $\beta = -\text{grad}\alpha$, and $\gamma$ is a tensor that embodies the dependence on the geometry of magnet M1 and the superconductor.

The first term represents the change of the force on magnet M1, due to a small displacement of magnet M2. As a result of Earnshaw's theorem, which states that all systems comprising permanent magnets and paramagnetic materials only are unstable, it is expected that $\beta$ has non-negative trace. For permanent magnets, it can be easily shown that $\beta$ is, in fact, traceless. The second term arises from the force between magnet M1 and the induced currents on the superconductor, when the superconductor is also given the same displacement. This force is proportional to the magnetization of magnet M1 and the induced current on the superconductor, which is, in turn, proportional to the magnetization of magnet M1 also. Since there is no relative displacement of magnet M2 and the superconductor, there is no induced current on the superconductor that is attributable to magnet M2. Application of the principle of linear superposition to get the resultant force on M1, results in equation (2) above.

In FIG. 1 are mapped out the contours of equal thrust and equal stability in the $B_1$-$B_2$ plane. From these, it can been seen that changing the magnetization of magnet M2, which is constrained to move with the superconductor as a whole, results in trading the stability for, or against the thrust that can be sustained; whereas, changing the magnetization of magnet M1, either enhances or decreases both the stability and the force.

The above principles of FIG. 1 can be applied to magnetic bearings. In practice, the strongest magnets, which are either superconducting or electromagnets, are not very convenient for rotating at high speeds. Thus, it is advantageous to use them in the role of magnet M1. The rotating shaft of the bearing could then be a rigid combination of a superconductor and a permanent magnet, which need not be as strongly magnetized.

In a thrust bearing system, when utilizing repelling magnets, the instability is generally in the radial direction. Should the repelling force between the magnets and the external thrust be slightly misaligned, the magnets would tend to shear away from each other in a plane perpendicular to the bearing axis. According to this invention a superconductor could be interposed between the magnets, perpendicular to the bearing axis, to stabilize against any radial perturbations on the shaft. The axial thrust supported by the magnets would be described by a scalar form of equation (1), and the overall radial stability would be described by a scalar form of equation (2).

In the case of utilizing two attracting magnets in a thrust bearing system, the instability to be guarded against is in the axial direction. This means that the magnitude of the attractive force between the magnets and the external pull must be delicately balanced. Should the magnetic attraction be just a bit smaller than the external pull, the magnets would fly apart whereas the magnets would move together should the external pull become slightly smaller. According to this invention, a superconductor is placed around one of the magnets to stabilize any motion in the axial direction resulting from a temporary imbalance of the forces involved. A scalar form of equation (1) describes the axial thrust, and a scalar form of equation (2) describes the overall axial stability of the system.

Another consequence of the model of FIG. 1 comes by noticing that $\beta$ depends only on the geometry of the M1-M2 combination, whereas $\gamma$ depends only on the geometry of the M1-superconductor combination. Since $\beta$ is always traceless, modifying the geometry of the M1-M2 combination can only result in a tradeoff of axial versus radial instability. Optimizing the geometry of the M1-superconductor combination will result in improved stability.

According to this invention for hybrid superconductor magnet bearings, the sustainable force and the stability are decoupled from each other. The sustainable force comes largely from the interaction between the magnets, while the interaction between the magnets and the superconductor provides the overall stability, but the distribution of this stability into the axial and radial components is strongly affected by the interaction between the magnets.

The present invention can be better understood with reference to several of the its embodiments which are described below.

Figure 2:
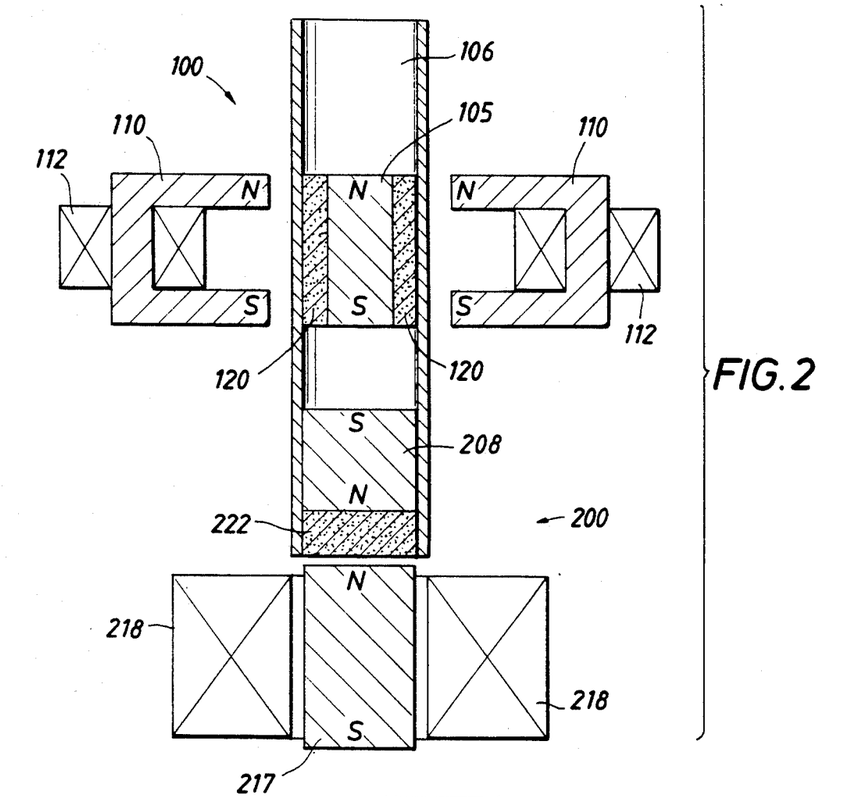
FIG. 2 is a cross-sectional view of a rotating shaft having a superconductor magnet hydrid thrust and journal bearing.

Referring now to the figures, FIG. 2 illustrates one embodiment of the present invention. FIG. 2 shows a superconductor-magnet hydrid bearing with electromagnet stators having a journal bearing 100 and thrust bearing 200.

The journal bearing 100 includes a rotating member 106, typically an elongated cylindrical shaft, which is to be centered at a particular desired location. Shaft 106 is typically rotating and is connected to some device, such as a motor, a generator, and the like. It is desirable to keep the rotating shaft 106 at a particular location and, in particular, to avoid any translation of any portion of shaft 106 in a direction extending radially outward from shaft 106 or along its axis.

Affixed to and moving with rotating shaft 106 is journal bearing shaft magnet 105. Journal bearing shaft magnet 105 is generally a permanent magnet because it is generally not very convenient to have superconducting or electromagnets rotating at high speeds. Located annularly around rotating shaft 106 at the location of journal bearing shaft magnet 105 is journal magnet 110. Although journal magnet 110 may be any type of magnet including permanent, electromagnet, superconducting electromagnet and superconducting replicas, it is shown in FIG. 2 as an electromagnet, with journal electromagnet coils 112. Superconducting electromagnets utilize superconducting material as the electrical coil. Superconducting replicas are made by trapping a magnetic field in a superconductor. The field remains trapped as long as the material remains superconducting.

Journal magnet 110 may comprise one annularly shaped magnet, or a number of magnets placed annularly around rotating shaft 106 at the location of journal bearing shaft magnet 105. Located between magnet 105 and magnet 110 is journal superconducting material 120. Superconducting material 120 is positioned to move relative to the magnetic field of journal magnet 110 but not with respect to the magnetic field of journal shaft magnet 105. This is easily accomplished by affixing superconducting material 120 to the shaft along with journal shaft magnet 105 as shown. Since superconducting material 120 is moving with respect to the magnetic field of journal magnet 110, increasing the magnetic field of journal magnet 110 by increasing the current through coils 112 will increase both the thrust and the stability of the journal bearing.

There may be more than one journal bearing 100 placed axially along shaft 106.

Located at the bottom end of shaft 106 is thrust bearing 200 comprising thrust bearing magnet 217, thrust bearing shaft magnet 208 and thrust superconductor 222. Affixed to and moving with rotating shaft 106 is thrust bearing shaft magnet 208. Thrust bearing shaft magnet 208 is generally a permanent magnet because it is generally not very convenient to have superconducting or electromagnets rotating at high speeds. Located below thrust bearing shaft magnet 208 is thrust bearing magnet 217. Although thrust bearing magnet may be any type of magnet including permanent, electromagnet, superconducting electromagnet and superconducting replicas, it is shown in FIG. 2 as an electromagnet, with thrust electromagnet coils 218. Superconducting material 222 is positioned to move relative to the magnetic field of thrust bearing magnet 217 but not with respect to the magnetic field of thrust bearing shaft magnet 208. This is easily accomplished by affixing superconducting material 222 to the shaft along with thrust bearing shaft magnet 208 as shown. Since superconducting material 222 is moving with respect to the magnetic field of thrust bearing magnet 217 increasing the magnetic field of thrust bearing magnet 217 by increasing the current through coils 218 will increase both the thrust and the stability of the thrust bearing.

In operation, rotating shaft is supported and suspended by thrust bearing 200. One or more journal bearings 100 prevent any translation of shaft 106 radially from its desired position. The magnets of thrust bearing 100 and the one or more journal bearings 200 are such that the magnetic systems are in the stable region of FIG. 1. The repulsive force of the thrust bearing maintains the rotating shaft suspended above the thrust bearing. The repulsive forces of the one or more journal bearings serve to automatically center and stabilize the rotating member in the radial direction.

Figure 3:
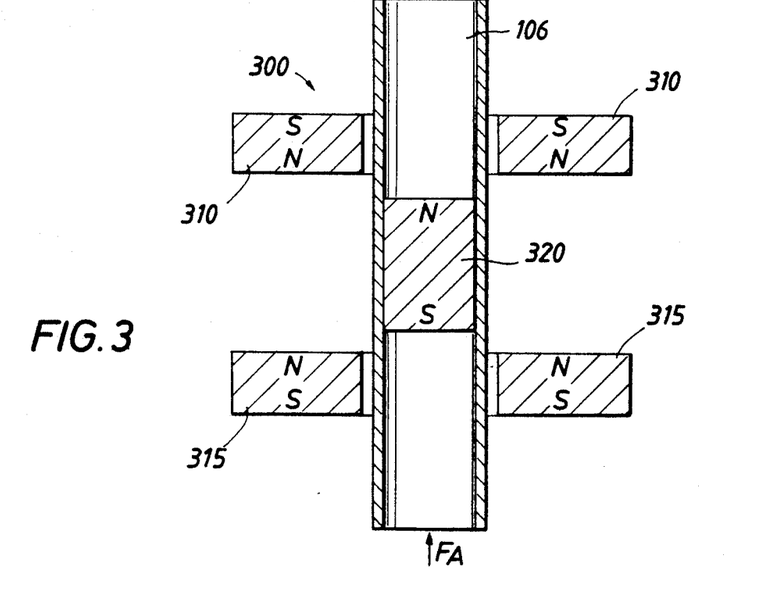
FIG. 3 is a cross-sectional view of a thrust supporting element.

FIG. 3 shows a thrust supporting element 300 of the present invention. The thrust supporting element 300 resists an axial force $F_A$ on rotating member 106, such as for example gas flow in a turbine. Thrust supporting element 300 is composed of a thrust magnet 320 that is affixed to and rotates with shaft 106. Thrust magnet 320 is generally a permanent magnet because it is generally not very convenient to have superconducting or electromagnets rotating at high speeds. Repulsion magnet 310 is positioned annularly around and axially down from force $F_A$ to both repulse shaft 106 back toward force $F_A$, and to automatically center and stabilize the rotating member 106 in the radial direction. Repulsion magnet 310 may be any type of magnet including permanent, electromagnet, superconducting electromagnet and superconducting replicas. Repulsion magnet 310 may be an annularly shaped magnet or a number of magnets placed annularly around shaft 106.

Situated annularly around and axially toward force $F_A$ to urge shaft 106 in the direction from which force $F_A$ is acting is attractive magnet 315. Attractive magnet 315 also serves to automatically center and stabilize the rotating member 106 in the radial direction. Attractive magnet 315 may be any type of magnet including permanent, electromagnet, superconducting electromagnet and superconducting replicas. Attractive magnet 315 may be an annularly shaped magnet or a number of magnets placed annularly around shaft 106.

In operation, as the axial load $F_A$ acts on rotating shaft 106, the repulsive magnet 310 and the attractive magnet 315 act to both resist the axial load, and automatically center and stabilize the rotating member 106 in the radial direction.

Figure 4:
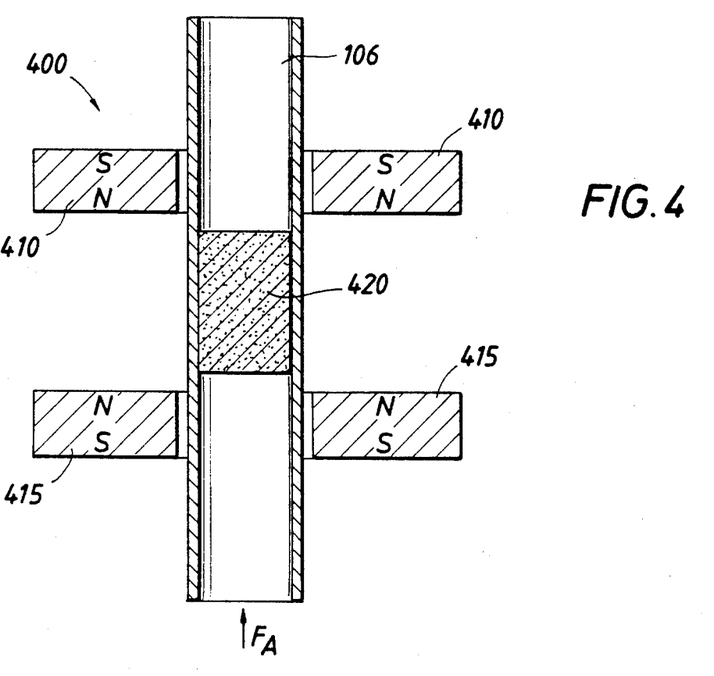
FIG. 4 is a cross-sectional view of a stabilizing element.

FIG. 4 shows a stabilizing element 400 of the present invention. Stabilizing element 400 is composed of a stabilizing superconductor 420 that is affixed to and rotates with shaft 106. Magnet 410 is positioned annularly around and axially down from force $F_A$ to maintain shaft 106 at its central position, and automatically center and stabilize the rotating member 106 in the radial direction. Magnet 410 may be any type of magnet including permanent, electromagnet, superconducting electromagnet and superconducting replicas. Magnet 410 may be an annularly shaped magnet or a number of magnets placed annularly around shaft 106.

Situated annularly around and axially toward force $F_A$ to prevent shaft 106 from moving toward or away from force $F_A$, and automatically center and stabilize the rotating member 106 in the radial direction is magnet 415. Magnet 415 may be any type of magnet including permanent or electromagnets. Magnet 415 may be an annularly shaped magnet or a number of magnets placed annularly around shaft 106.

Figure 5:
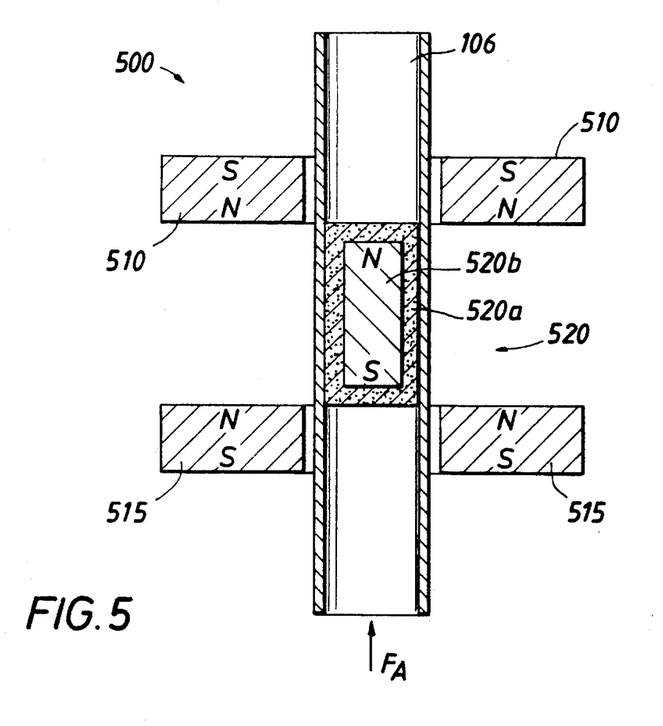
FIG. 5 is a cross-sectional view of an integrated thrust supporting and stabilizing element.

FIG. 5 shows an integrated thrust supporting and stabilizing element incorporating the systems as shown in FIG. 3 and FIG. 4 into one system. Magnets 510 and 515 are positioned axially on each side of integrated thrust supporting and stabilizing element 520. Magnets 510 and 515 may be any type of magnet including including permanent, electromagnet, superconducting electromagnet and superconducting replicas. Magnets 510 and 515 may be an annularly shaped magnet or a number of magnets placed annularly around shaft 106.

Integrated thrust supporting and stabilizing element 520 comprises magnet 520b and superconductor 520a. Magnet 520b is generally a permanent magnet because it is generally not very convenient to have superconducting or electromagnets rotating at high speeds.

The systems shown in FIGS. 3–5 can be utilized in series axially along a shaft in a multi-stage bearing system. Each stage in multi-stage bearing system can be comprised of either (a) thrust supporting element, with magnets placed annularly around and axially on the bearing shaft, exemplified in FIG. 3; or (b) a stabilizing element with magnets placed annularly around the bearing shaft and type II HTS material axially on the bearing shaft, exemplified in FIG. 4, or type II HTS material annularlyly around the bearing shaft and magnets axially o the bearing shaft; or (c) an integrated thrust and stabilizing element, combining the ideas embodied in (a) and (b) described above, and exemplified in FIG. 5. The multi-stage bearing can combine these stages in any proportion to acquire a desirable level of thrust to be supported with sufficient stability. The ultimate strength of the multi-stage bearing is the accumulative strength of the individual stages.

Figure 6:
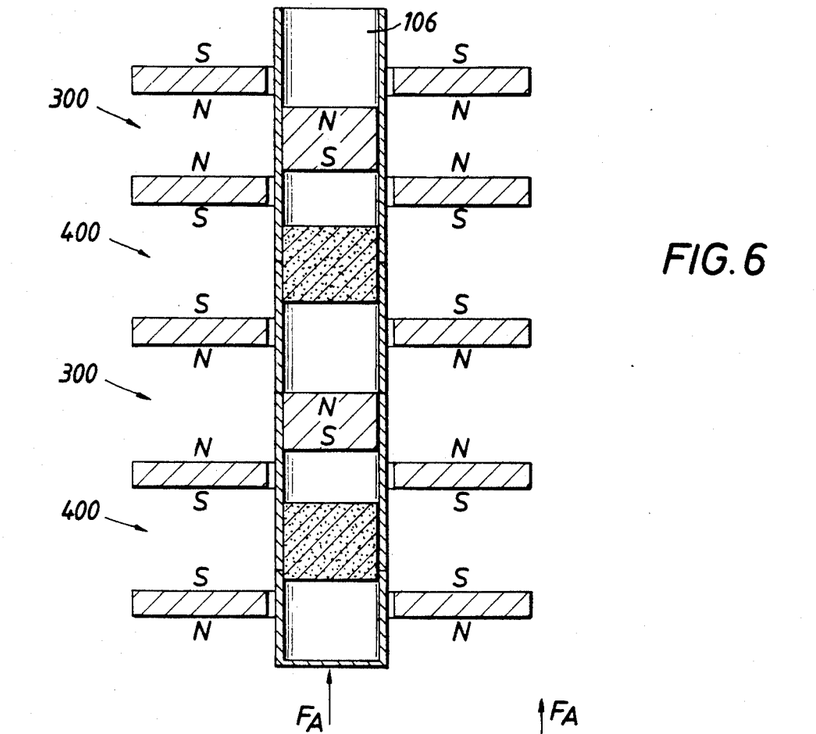
FIG. 6 is a cross-sectional view of a multi-stage bearing utilizing thrust supporting and stabilizing elements as shown in FIG. 3 and FIG. 4.

FIG. 6 shows an example of a multi-stage bearing system comprising two each of the thrust supporting element 300 of FIG. 3 and the stabilizing element 400 of FIG. 4. A multiplicity of the integrated elements of FIG. 6 could also be incorporated in a multi-stage bearing system.

Utilizing the accumulative strength of each stage in such a multi-stage bearing system helps to overcome any barriers to attaining high thrust with stability that are due to the limitations in the strength of the magnets and the amount of current that can be passed through electromagnets.

Figure 7:
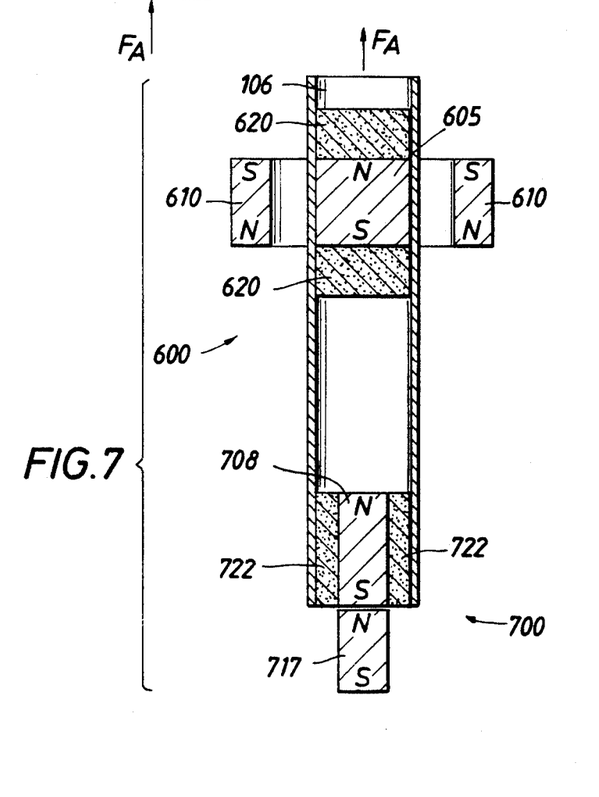
FIG. 7 is a cross-sectional view of a rotating shaft having a superconductor magnet hydrid thrust and journal bearing.

While the above embodiments have illustrated the use of repulsing magnets, it is also understood that attracting magnets can also be utilized. FIG. 7 shows a cross-sectional view of a rotating shaft 106 having journal bearing 600 and thrust bearing 700, with each bearing utilizing attracting magnet systems.

Affixed to and moving with rotating shaft 106 is journal bearing shaft magnet 605. Journal bearing shaft magnet 605 is generally a permanent magnet because it is generally not very convenient to have superconducting or electromagnets rotating at high speeds. Located around rotating shaft 106 at the location of journal bearing shaft magnet 605 is journal magnet 610. Although journal magnet may be any type of magnet including permanent, electromagnet, superconducting electromagnet and superconducting replicas, it is shown in FIG. 7 as a permanent magnet.

Journal magnet 610 may comprise one annularly shaped magnet, or a number of magnets placed annularly around rotating shaft 106 at the location of journal bearing shaft magnet 605. Located above and below magnet 605 and magnet 610 is journal superconducting material 620. Superconducting material 620 is positioned to move relative to the journal magnet 610 but not with respect to journal shaft magnet 605. This is easily accomplished by affixing superconducting material 620 to the shaft along with journal shaft magnet 605 as shown. Since superconducting material 620 is moving with respect to the magnetic field of journal magnet 610 increasing the magnetic field of journal magnet 610 will increase both the thrust and the stability of the journal bearing.

There may be more than one journal bearing 600 placed axially along shaft 606.

Located at the bottom end of shaft 106 is thrust bearing 700 comprising thrust bearing magnet 717, thrust bearing shaft magnet 708 and thrust superconductor 722. Affixed to and moving with rotating shaft 106 is thrust bearing shaft magnet 708. Thrust bearing shaft magnet 708 is generally a permanent magnet because it is generally not very convenient to have superconducting or electromagnets rotating at high speeds. Located below thrust bearing shaft magnet 708 is thrust bearing magnet 717. Although thrust bearing magnet may be any type of magnet including permanent, electromagnet, superconducting electromagnet and superconducting replicas, it is shown in FIG. 2 a permanent magnet. Superconducting material 722 is positioned to move relative to the magnetic field of thrust bearing magnet 717 but not with respect to the magnetic field of thrust bearing shaft magnet 708. This is easily accomplished by affixing superconducting material 722 to the shaft along with thrust bearing shaft magnet 708 as shown. Since superconducting material 722 is moving with respect to thrust bearing magnet 717 increasing the magnetic field of thrust bearing magnet 717 will increase both the thrust and the stability of the thrust bearing.

In operation, rotating shaft resists axial load $F_A$ by the attractive force between magnets 708 and 717. One or more journal bearings 700 prevent any translation of shaft 106 radially from its desired position. The magnets of thrust bearing 700 and the one or more journal bearings 700 are such that the magnetic systems are in the stable region of FIG. 1. The attractive force of the thrust bearing resists axial load $F_A$. The attractive forces of the one or more journal bearings serve to automatically center and stabilize the rotating member in the radial direction.

As a refinement, it may be desirable that if electromagnets are utilized in any embodiment of the present invention that the electrical coils of the electromagnets to be produced from a high temperature superconducting material. Coils made from such materials and kept at temperatures below the critical temperature have the ability to sustain a current undiminished. Such an embodiment, involving HTS electromagnets, would thus be quite useful, for example, in outer space applications where low temperatures are easy to maintain and where it is important to use bearings which are as small as possible in order to minimize the payload of the launching rocket.

In yet another refinement, the magnetic fields of permanent magnets utilized may be made more uniform. In the process of manufacturing permanent magnets or cores for electromagnets, certain asymmetries are introduced which cause the produced magnet or core to generate a non-uniform magnetic field. Such asymmetry results in the dissipation of energy and is to be avoided or minimized.

The present invention may also be utilized, not only to increase the stabiliy and thrust of a magnetic system, but may also be used as a control mechanism to vary the stability and thrust of the system between different states as desired. For example, the magnetic field of the magnet in motion relative to the superconducter could be varied, wherein said magnet is an electromagnet, in response to a need for greater or lesser thrust to meet a given situation as may be determined by an automatic sensing device.

It is an optional feature of the present invention that the effect of such asymmetry can be significantly reduced by "twinning" the permanent magnet or core. By "twinning" is meant the process of cutting a magnet, or simple dipole, in a direction perpendicular to its internal magnetic field lines into two or more sections. The sections of the dipole are then rotated relative to each until a relative position is found which tends to minimize the asymmetry in the magnetic field distribution. At this point the relative position of the sections of the dipole are fixed and the twinned dipole is installed in the bearing.

The twin dipole is thus made up of two single dipoles, with facing opposite poles, and which are permanently attached to each other to form a single dipole with relatively uniform magnetic field distribution.

The devices disclosed can be further improved by replacing the HTS material in each device with a laminated superconductor. Lamination of the superconductor can be achieved by stacking alternating layers of HTS and an insulator, typically a ferromagnetic or non-ferromagnetic material. A suitable material for use in the insulating layers of the laminated superconductor is mumetal, or permalloy. Layering the superconductor creates additional surface area. The insulator layers of the superconductor serve to concentrate the magnetic flux, through the Meissner effect. This effect produces higher magnetic forces than would be produced by flux pinning. Hence, use of laminated superconductor in a magnetic bearing increases the magnetic stiffness and provide better lifting force.

Although the present invention has been disclosed in connection with a number of specific embodiments, it is believed that many different additional geometrical configurations may be used without departing from the spirit of the present invention. Additional configurations can be obtained by rearranging the shape, size, thickness, and the like, of the various structural members. Furthermore, many combinations of the various features of the present invention may be made without the exercise of invention in the light of the present teachings.

It is seen that the present invention and the embodiments disclosed herein are well adapted to carry out the objectives and obtain the ends set forth at the outset. Certain changes can be made in the method without departing from the spirit and the scope of this invention. It is realized that changes are possible and it is further intended that each element recited in any of the following claims is to be understood as referring to all equivalent elements for accomplishing substantially the same results in substantially the same or equivalent manner. It is intended to cover the invention broadly in whatever form its principles may be utilized. The present invention is, therefore, well adapted to carry out the objects and obtain the ends and advantages mentioned, as well as others inherent therein.

Those skilled in the art may find many variations and adaptations thereof, and all such variations and adaptations, falling within the true scope and spirit of applicant's invention, are intended to be covered thereby.

What is claimed is:

1. A magnetic repulsion system comprising:
   a first magnet having a magnetic field $B_1$;
   a second magnet having a magnetic field $B_2$; and
   a superconductor;
   wherein the magnets are in motion relative to each other and are oriented to repulse each other, the superconductor is interposed between the magnets and is in motion relative the first magnet and stationary relative the second magnet, and magnetic fields $B_1$ and $B_2$ are selected to provide for a stable high thrust repulsion system.

2. The system of claim 1 wherein the superconductor is interposed between the magnets, the first magnet is a permanent magnet and the second magnet is an electromagnet with a variably adjustable magnetic field.

3. A journal or thrust bearing comprising the magnetic repulsion system of claim 1.

4. A method of increasing the repulsive force and stability of a magnetic system comprising:
   a first magnet having a magnetic field $B_1$;
   a second magnet having a magnetic field $B_2$; and
   a superconductor;
   wherein the magnets are in motion relative to each other and are oriented to repulse each other, the superconductor is interposed between the magnets and is in motion relative the first magnet and stationary relative the second magnet, and magnetic fields $B_1$ and $B_2$ are selected to provide for a stable system,
   said method comprises increasing the magnetic field of the first magnet.

5. The method of claim 4 wherein the first magnet is a permanent magnet and the second magnet is an electromagnet with a variably adjustable magnetic field.

6. A magnetic attraction system comprising:
   a first magnet having a magnetic field $B_1$;
   a second magnet having a magnetic field $B_2$; and
   a superconductor;
   wherein the magnets are in motion relative to each other and are oriented to attract each other, the superconductor is positioned around the second magnet outside of the area between the magnets, and the superconductor is in motion relative the first magnet and stationary relative the second magnet, and magnetic fields $B_1$ and $B_2$ are selected to provide for a stable magnetic attraction system.

7. The system of claim 6 wherein the superconductor is located around the first magnet outside of the are between the magnets, the first magnet is a permanent magnet and the second magnet is an electromagnet with a variably adjustable magnetic field.

8. A journal or thrust bearing comprising the magnetic attraction system of claim 6.

9. A method of increasing the attractive force and stability of a magnetic system comprising:
   a first magnet having a magnetic field $B_1$;
   a second magnet having a magnetic field $B_2$; and
   a superconductor;
   wherein the magnets are in motion relative to each other and are oriented to attract each other, the superconductor is located around the second magnet outside of the area between the magnets, said superconductor in motion relative the first magnet and stationary relative the second magnet, and magnetic fields $B_1$ and $B_2$ are selected to provide for a stable system, and
   said method comprises increasing the magnetic field of the first magnet.

10. The method of claim 9 wherein the first magnet is a permanent magnet and the second magnet is an electromagnet with a variably adjustable magnetic field.

11. A journal bearing structure, comprising:
    (a) a rotatable member rotatable about an axis;
    (b) a first magnet attached to the rotatable member;
    (c) a second magnet adjacent said first magnet and rotatable member and magnetically interacting with the first magnet; and
    (d) a superconductor positioned such that it is in relative motion with respect to the second magnet and stationary with respect to the first magnet.

12. The journal bearing of claim 11 wherein the magnets are oriented to repulse each other, and the superconductor is interposed between the magnets.

13. The journal bearing of claim 12 wherein the first magnet is a permanent magnet and the second magnet is an electromagnet with a variably adjustable magnetic field.

14. The journal bearing of claim 11 wherein the magnets are oriented to attract each other, and the superconductor is located around the first magnet outside of the area between the magnets.

15. The journal bearing of claim 14 wherein the first magnet is a permanent magnet and the second magnet is an electromagnet with a variably adjustable magnetic field.

16. A thrust bearing structure comprising:
(a) a rotatable member rotatable about an axis;
(b) a first magnet attached to one end of the rotatable member with poles oriented along said axis;
(c) a second magnet adjacent and magnetically interacting with said first magnet and adjacent the rotatable member, with its poles oriented in line with said axis; and
(d) a superconductor positioned such that it is in relative motion with respect to the second magnet and stationary with respect to the first magnet.

17. The thrust bearing of claim 16 wherein the magnets are oriented to repulse each other, and the superconductor is interposed between the magnets.

18. The thrust bearing of claim 17 wherein the first magnet is a permanent magnet and the second magnet is an electromagnet with a variably adjustable magnetic field.

19. The thrust bearing of claim 16 wherein the magnets are oriented to attract each other, and the superconductor is located around the first magnet outside of the area between the magnets.

20. The thrust bearing of claim 19 wherein the first magnet is a permanent magnet and the second magnet is an electromagnet with a variably adjustable magnetic field.

* * * * *